United States Patent
Ferguson et al.

(10) Patent No.: US 12,547,174 B1
(45) Date of Patent: *Feb. 10, 2026

(54) APPROACH FOR CONSOLIDATING OBSERVED VEHICLE TRAJECTORIES INTO A SINGLE REPRESENTATIVE TRAJECTORY

(71) Applicant: Waymo LLC, Mountain View, CA (US)

(72) Inventors: David I. Ferguson, San Francisco, CA (US); Jiajun Zhu, Palo Alto, CA (US)

(73) Assignee: WAYMO LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,091

(22) Filed: Feb. 1, 2024

Related U.S. Application Data

(63) Continuation of application No. 17/849,821, filed on Jun. 27, 2022, now Pat. No. 11,921,510, which is a
(Continued)

(51) Int. Cl.
  *B62D 15/02* (2006.01)
  *B60W 10/18* (2012.01)
  (Continued)

(52) U.S. Cl.
  CPC ......... *G05D 1/0212* (2013.01); *B60W 30/095* (2013.01); *B60W 40/04* (2013.01);
  (Continued)

(58) Field of Classification Search
  CPC ...... G05D 1/0212; G05D 1/00; G05D 1/0088; G05D 1/0214; G05D 1/0223;
  (Continued)

(56) References Cited

U.S. PATENT DOCUMENTS 5,483,453 A * 1/1996 Uemura ............... G05D 1/0255
  318/587
5,572,449 A * 11/1996 Tang ................... B60K 31/0008
  700/304
(Continued)

FOREIGN PATENT DOCUMENTS

CN   104012123 A   8/2014
CN   102231235 B   2/2016
(Continued)

OTHER PUBLICATIONS

Sarholz , et al., "Evaluation of Different Approaches for Road Course Estimation using Imaging Radar", IEEE/RSJ International conference on Intelligent Robots and Systems, San Francisco, CA, USA, Sep. 25-30, 2011, pp. 4587-4592.

*Primary Examiner* — Dale W Hilgendorf
(74) *Attorney, Agent, or Firm* — Botos Churchill IP Law

(57) ABSTRACT

A method and apparatus is provided for controlling the operation of an autonomous vehicle. According to one aspect, the autonomous vehicle may track the trajectories of other vehicles on a road. Based on the other vehicle's trajectories, the autonomous vehicle may generate a pool of combined trajectories. Subsequently, the autonomous vehicle may select one of the combined trajectories as a representative trajectory. The representative trajectory may be used to change at least one of the speed or direction of the autonomous vehicle.

20 Claims, 15 Drawing Sheets

Related U.S. Application Data continuation of application No. 17/081,084, filed on Oct. 27, 2020, now Pat. No. 11,402,841, which is a continuation of application No. 15/976,179, filed on May 10, 2018, now Pat. No. 10,852,733, which is a continuation of application No. 15/216,199, filed on Jul. 21, 2016, now Pat. No. 10,012,991, which is a continuation of application No. 14/449,792, filed on Aug. 1, 2014, now Pat. No. 9,459,625, which is a continuation of application No. 13/422,688, filed on Mar. 16, 2012, now Pat. No. 8,825,265.

(51) Int. Cl.

| | | |
|---|---|---|
| *B60W 10/20* | (2006.01) | |
| *B60W 30/095* | (2012.01) | |
| *B60W 30/16* | (2020.01) | |
| *B60W 40/04* | (2006.01) | |
| *B60W 40/072* | (2012.01) | |
| *B60W 50/04* | (2006.01) | |
| *B60W 60/00* | (2020.01) | |
| *B62D 1/00* | (2006.01) | |
| *B62D 6/00* | (2006.01) | |
| *B62D 15/00* | (2006.01) | |
| *G01C 21/26* | (2006.01) | |
| *G01S 13/86* | (2006.01) | |
| *G01S 13/931* | (2020.01) | |
| *G01S 15/42* | (2006.01) | |
| *G01S 17/42* | (2006.01) | |
| *G01S 17/88* | (2006.01) | |
| *G05D 1/00* | (2006.01) | |
| *G08G 1/0967* | (2006.01) | |
| *G08G 1/00* | (2006.01) | |

(52) U.S. Cl.
CPC ...... *B60W 40/072* (2013.01); *B60W 60/0011* (2020.02); *B62D 1/00* (2013.01); *B62D 6/00* (2013.01); *B62D 15/00* (2013.01); *B62D 15/025* (2013.01); *B62D 15/0255* (2013.01); *B62D 15/026* (2013.01); *G01C 21/26* (2013.01); *G05D 1/00* (2013.01); *G05D 1/0088* (2013.01); *G05D 1/0214* (2013.01); *G05D 1/0223* (2013.01); *G05D 1/0287* (2013.01); *G08G 1/096725* (2013.01); *B60W 10/18* (2013.01); *B60W 10/20* (2013.01); *B60W 30/16* (2013.01); *B60W 2050/048* (2013.01); *G01S 13/865* (2013.01); *G01S 13/867* (2013.01); *G01S 2013/9325* (2013.01); *G01S 15/42* (2013.01); *G01S 17/42* (2013.01); *G01S 17/88* (2013.01); *G01S 2205/002* (2013.01); *G05D 1/0246* (2013.01); *G05D 1/0293* (2013.01); *G08G 1/20* (2013.01); *G08G 1/22* (2013.01)

(58) Field of Classification Search
CPC .. G05D 1/0287; G05D 1/0246; G05D 1/0293; B60W 30/095; B60W 40/04; B60W 40/072; B60W 10/18; B60W 10/20; B60W 30/16; B60W 2050/048; B62D 6/00; B62D 15/0255; B62D 15/026; G01C 21/26; G08G 1/096725; G08G 1/20; G08G 1/22; G01S 13/865; G01S 13/867; G01S 15/42; G01S 17/42; G01S 2013/9325; G01S 2205/002
See application file for complete search history.

(56) References Cited

U.S. PATENT DOCUMENTS

| | | | |
|---|---|---|---|
| 6,032,097 A * | 2/2000 | Lihoshi | G08G 1/22 |
| | | | 340/436 |
| 6,169,940 B1 | 1/2001 | Jitsukata et al. | |
| 6,600,991 B1 | 7/2003 | Jardin | |
| 6,963,795 B2 | 11/2005 | Haissig et al. | |
| 7,024,309 B2 | 4/2006 | Doane | |
| 7,617,037 B2 | 11/2009 | Desens et al. | |
| 8,825,265 B1 | 9/2014 | Ferguson et al. | |
| 8,880,272 B1 | 11/2014 | Ferguson et al. | |
| 8,996,228 B1 | 3/2015 | Ferguson et al. | |
| 9,459,625 B1 | 10/2016 | Ferguson et al. | |
| 10,012,991 B1 * | 7/2018 | Ferguson | B60W 40/04 |
| 10,852,733 B1 | 12/2020 | Ferguson et al. | |
| 11,402,841 B1 | 8/2022 | Ferguson et al. | |
| 11,548,510 B2 * | 1/2023 | Honda | B60W 30/18163 |
| 11,921,510 B1 * | 3/2024 | Ferguson | B60W 60/0011 |
| 2004/0230373 A1 | 11/2004 | Tzamaloukas | |
| 2007/0070069 A1 | 3/2007 | Samarasekera et al. | |
| 2008/0082261 A1 | 4/2008 | Tengler et al. | |
| 2009/0024357 A1 | 1/2009 | Aso et al. | |
| 2009/0125203 A1 * | 5/2009 | Lindqvist | G08G 1/166 |
| | | | 701/96 |
| 2009/0248270 A1 * | 10/2009 | Sekiguchi | G08G 1/166 |
| | | | 701/96 |
| 2010/0121576 A1 * | 5/2010 | Aso | G08G 1/166 |
| | | | 701/300 |
| 2010/0168937 A1 | 7/2010 | Soijer et al. | |
| 2010/0256836 A1 * | 10/2010 | Mudalige | G08G 1/164 |
| | | | 701/25 |
| 2010/0256852 A1 | 10/2010 | Mudalige | |
| 2011/0054793 A1 | 3/2011 | Harada et al. | |
| 2011/0231087 A1 | 9/2011 | Johnson et al. | |
| 2012/0083964 A1 | 4/2012 | Montemerlo et al. | |
| 2013/0184926 A1 | 7/2013 | Spero et al. | |
| 2019/0337507 A1 * | 11/2019 | Stein | B60W 50/0097 |
| 2020/0156631 A1 * | 5/2020 | Lin | G05D 1/0257 |
| 2020/0307600 A1 | 10/2020 | Sato | |
| 2020/0388157 A1 * | 12/2020 | Fukushige | G08G 1/166 |
| 2022/0169281 A1 * | 6/2022 | Lin | G06V 20/588 |

FOREIGN PATENT DOCUMENTS

| | | |
|---|---|---|
| JP | H06325287 A | 11/1994 |
| WO | 2004072753 A1 | 8/2004 |
| WO | 2006126400 A1 | 11/2006 |

* cited by examiner

Vehicle 210 Detects That the Right Lane Is Closed

APPROACH FOR CONSOLIDATING OBSERVED VEHICLE TRAJECTORIES INTO A SINGLE REPRESENTATIVE TRAJECTORY

CROSS-REFERENCE TO RELATED APPLICATIONS

The present application is a continuation of U.S. patent application Ser. No. 17/849,821, filed Jun. 27, 2022, now issued as U.S. Pat. No. 11,921,510, which is a continuation of U.S. patent application Ser. No. 17/081,084, filed Oct. 27, 2020, now issued as U.S. Pat. No. 11,402,841, which is a continuation of U.S. patent application Ser. No. 15/976,179, filed May 10, 2018, now issued as U.S. Pat. No. 10,852,733, which is a continuation of U.S. patent application Ser. No. 15/216,199, filed Jul. 21, 2016, now issued as U.S. Pat. No. 10,012,991, which is a continuation of U.S. patent application Ser. No. 14/449,792, filed Aug. 1, 2014, now issued as U.S. Pat. No. 9,459,625, which is a continuation of U.S. patent application Ser. No. 13/422,688, filed Mar. 16, 2012, now issued as U.S. Pat. No. 8,825,265, the disclosures of which are incorporated herein by reference.

BACKGROUND

Autonomous vehicles use computing systems to aid in the transport of passengers from one location to another. Such vehicles may be equipped with various types of sensors in order to detect objects in their surroundings. Autonomous vehicles may include lasers, sonar, radar, cameras, and other devices which scan and record data from the vehicle's surroundings. These devices may be used to detect the geometry of the road on which the vehicles are travelling and determine the locations of the road's curb and lanes.

FIG. 1, depicts a flowchart 100 of a high-level process executed by autonomous vehicles in general. According to the process, an autonomous vehicle is programmed with a destination and asked to reach it (task 110). Upon receiving the destination, the autonomous vehicle may retrieve a map and derive a model for the geometry of the road on which the vehicle may be travelling (task 120). Afterwards, the vehicle may use the road model to stay on the road and reach the destination safely (task 130).

When road maintenance is performed, lanes in the road may become closed or shifted. The road geometry may change and the map used to produce the road model may become inaccurate. The inaccuracy may carry into the road model generated based on the map. This may pose danger to the safe operation of the autonomous vehicle, for instance putting it at risk of crashing into barriers or other types of road blocks.

SUMMARY

In one aspect, a method is provided for controlling a vehicle. The method includes tracking a plurality of vehicles to obtain a plurality of observed trajectories. Each one of the plurality of observed trajectories includes locations passed by a vehicle from the plurality of vehicles. The method further includes generating, by a processor, a plurality of generated trajectories. Each one of the plurality of generated trajectories is generated using a different observed trajectory as a base. Furthermore, each one of the plurality of generated trajectories is generated by: selecting one of the plurality of observed trajectories as a base, combining the selected observed trajectory with remaining ones in the plurality of observed trajectories to generate a resultant set of locations, and combining the resultant set of locations with all observed trajectories in the plurality of observed trajectories. Once the plurality of generated trajectories is generated, a first generated trajectory is selected from the plurality of generated trajectories and then at least one of a speed of a vehicle and a direction of the vehicle is changed based on the selected first generated trajectory.

In one example, the first generated trajectory may be selected based on a characteristic of a curvature of the first generated trajectory. In another example, the first generated trajectory may be selected based on a discontinuity in the first generated trajectory. In yet another example, the first generated trajectory may be selected based on a characteristic of a distribution of locations in the first generated trajectory. In another example, the current location of the vehicle may be determined and the first generated trajectory may be selected based on a distance between the current location and a location that is part of the first generated trajectory. Moreover, the plurality of generated trajectories may be generated using an expectation-maximization (EM) process. Furthermore, the combining of the selected observed trajectory with the remaining ones in the plurality of observed trajectories may include identifying, for each location in the selected observed trajectory, locations in remaining ones of the plurality of observed trajectories that are within a predetermined distance from the location in the selected observed trajectory.

In another aspect, a method includes determining a plurality of observed trajectories of vehicles that are travelling on the same road as a first vehicle, determining a first location by combining locations found in two or more observed trajectories from the plurality of observed trajectories, and selecting a second location that is part of an observed trajectory from the plurality of observed trajectories. The method also includes calculating, by a processor, a third location based on the first location. The third location is located between the first location and the second location. The method further includes controlling, by the processor, the operation of the first vehicle based on the third location. In some instances, controlling the operation of the first vehicle may include changing at least one of a speed of the first vehicle and a direction of the first vehicle based on the third location.

The second location may be selected based on a distance to the first location. The first location and the second location may be calculated during different iterations of a process for generating the third location. In this case, the third location is used in controlling the operation of the first vehicle only when it is determined by the processor that a predetermined number of iterations of the process have been completed. The first location may be part of a first generated trajectory. The third location may be part of a third generated trajectory. And the third location may be used in controlling the operation of the first vehicle only when the third trajectory satisfies a criterion for similarity in shape to the first trajectory.

The method may further include identifying a constraint for at least one of a shape of the first observed trajectory, and a quality of information used as a basis for determining the first observed trajectory. In addition, the method may include determining a characteristic of the first trajectory, the characteristic concerning at least one of the shape of the first observed trajectory, and quality of information used as a basis for determining the first observed trajectory. Moreover, the method may include determining, based on the determined characteristic, an extent to which the first trajectory meets the constraint. The third location may also be calculated based on the extent to which the first trajectory meets the constraint. In some instances, the third location may be used in controlling the operation of the first vehicle only when it is determined by the processor that the third location is within a predetermined distance from the first location.

In a yet another aspect, an apparatus is provided that includes a processor configured to track a first vehicle to obtain an observed trajectory. The observed trajectory includes a first plurality of locations passed by the first vehicle. Moreover, the processor is configured to execute a process having an initial iteration that is executed first and a final iteration that is executed last. The initial iteration of the process generates a resultant set of locations based on a plurality of locations from the observed trajectory, and each subsequent iteration, after the initial iteration, generates another resultant set of locations based on the resultant set of locations that is generated during a preceding iteration. Furthermore, the processor is configured to change at least one of a speed of the second vehicle and a direction of the second vehicle based on one or more locations that are part of the another resultant set generated by the final iteration.

The process executed by the processor may implement an expectation-maximization (EM) process. In yet other instances, the another resultant set of locations generated by the final iteration may be generated based on the resultant set of locations generated during an iteration immediately preceding the final iteration. The number of times the processor performs a subsequent iteration in the process may depend on a rule specifying a maximum number of iterations. In other instances, the number of times the processor performs a subsequent iteration may depend on a comparison between the final resultant set of locations and a resultant set of locations generated during an iteration preceding the final iteration.

DETAILED DESCRIPTION

In one aspect, an autonomous vehicle may use the trajectories of other vehicles on the road to detect lane closures and road blocks. When a large number of vehicles move away from one lane to another, in a given section of road, oftentimes they do so because the former lane is closed. The autonomous vehicle may monitor the other vehicles' trajectories and take the trajectory most traveled. By following the path of other vehicles, the autonomous vehicle may bypass road blocks in the same way vehicles ahead of it did.

In another aspect, the autonomous vehicle may perform map updates when road lanes are closed. The autonomous vehicle may calculate a first trajectory based on the other vehicle's trajectories and a second trajectory based on a map. It may then match the two trajectories. A mismatch may indicate that the representation of the road in the map is inaccurate. The autonomous vehicle may take action to correct the map or flag the inaccuracy.

Figure 1:
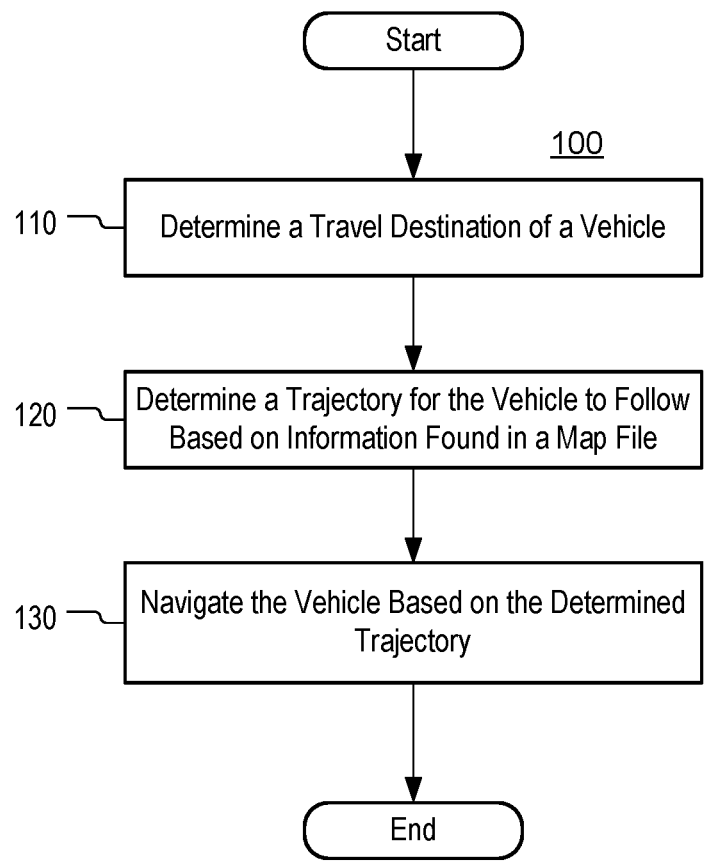
FIG. 1 depicts a flowchart of a process executed by known autonomous vehicles.
Figure 2:
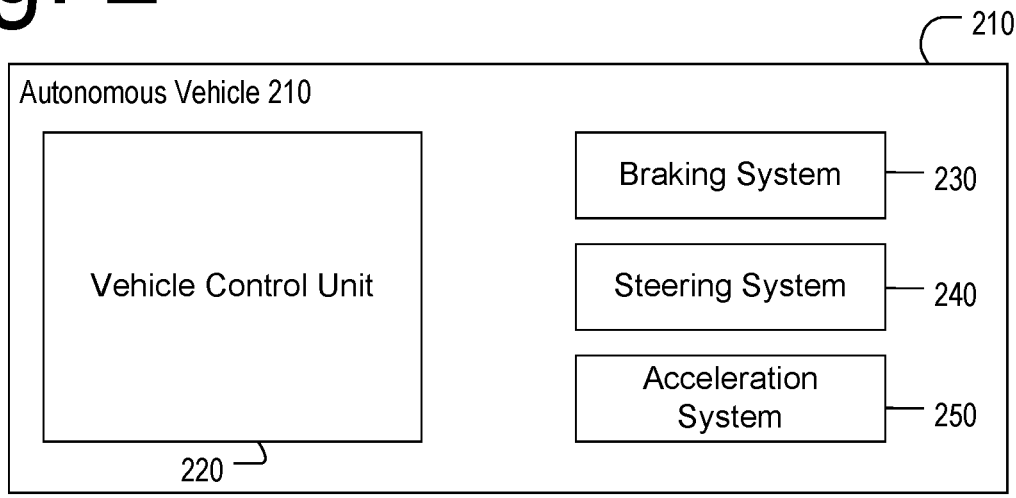
FIG. 2 depicts a schematic diagram of components of an autonomous vehicle in accordance with aspects of the disclosure.

FIG. 2 depicts a schematic diagram of the components of autonomous vehicle 210 in accordance with aspects of the disclosure. As shown in this example, vehicle 210 includes vehicle control unit 220, braking system 230, steering system 240, and acceleration system 250. Vehicle 210 is capable of driving from one point to another without (or with partial) input from a human driver. In some embodiments, vehicle 210 is an automobile. In various embodiments vehicle 210 may be a car, truck, motorcycle, bus, boat, airplane, helicopter, lawnmower, recreational vehicle, amusement park vehicle, farm equipment, construction equipment, tram, golf cart, train, trolley, glider, warehouse equipment, factory equipment, or the like. Vehicle control unit 220 is a system for controlling the operation of vehicle 210. Vehicle control unit 220 may interact with braking system 230, steering system 240, and acceleration system 250 to cause vehicle 210 to slow down, stop, steer, or accelerate.

Figure 3:
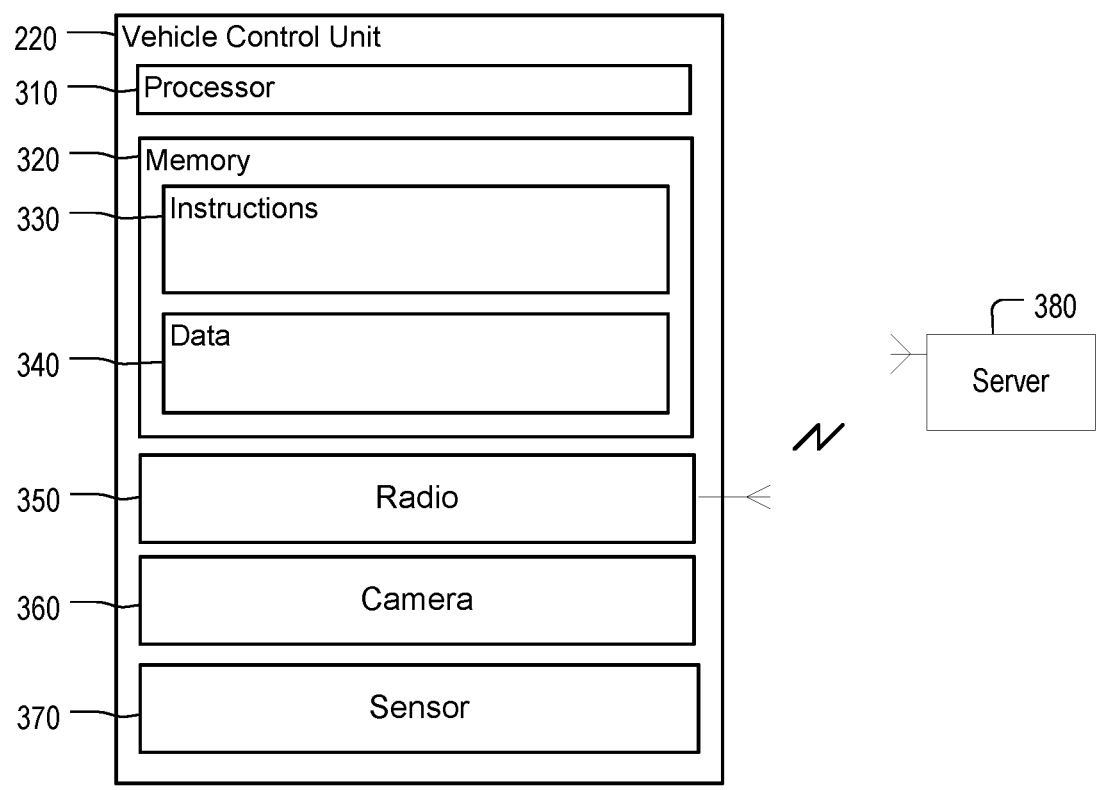
FIG. 3 depicts another schematic diagram of components of the autonomous vehicle in accordance with aspects of the disclosure.

As shown in FIG. 3, vehicle control unit 220 may include a processor 310, memory 320, radio 350, a camera 360, and sensor 370. Memory 320 of vehicle control unit 220 stores information accessible by processor 310, including instructions 330 that may be executed by the processor 310. The memory also includes data 340 that may be retrieved, manipulated or stored by the processor. The memory may be of any type of tangible media capable of storing information accessible by the processor, such as a hard-drive, memory card, ROM, RAM, DVD, CD-ROM, write-capable, and read-only memories. The processor 310 may be any well-known processor, such as commercially available processors. Alternatively, the processor may be a dedicated controller such as an ASIC.

The instructions 330 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 340 may be retrieved, stored or modified by processor 310 in accordance with the instructions 330. For instance, although the system and method are not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 3 functionally illustrates the processor and memory as being within the same block, the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

Sensor 370 may include a sensor for detecting pitch, yaw, or roll of vehicle 210. Similarly, sensor 370 may be a laser scanner such, sonar, radar, lidar, or another similar device for detecting obstacles. Camera 360 is a camera for taking pictures of the surroundings of vehicle 210. Camera 360 may be used to detect road blocks, road lanes, and other environmental information. Radio 350 may be an 802.11 transceiver, a 3G transceiver, a communication unit for inter-vehicle communication, or any other type of transceiver for receiving and transmitting information. Radio 350 may be connected to server 380 over a wireless network. The server 380 may store information used by the vehicle control unit 220 when controlling the vehicle. Such information may include maps, information about other vehicles' trajectories, road conditions, climate conditions, and so forth. The server 380 may receive from vehicle 210 (via radio 350) map updates, map corrections, as well as other indication of lane closures. The server 380 may store the received information in memory or disseminate it among other autonomous vehicles on the road.

Figure 4:
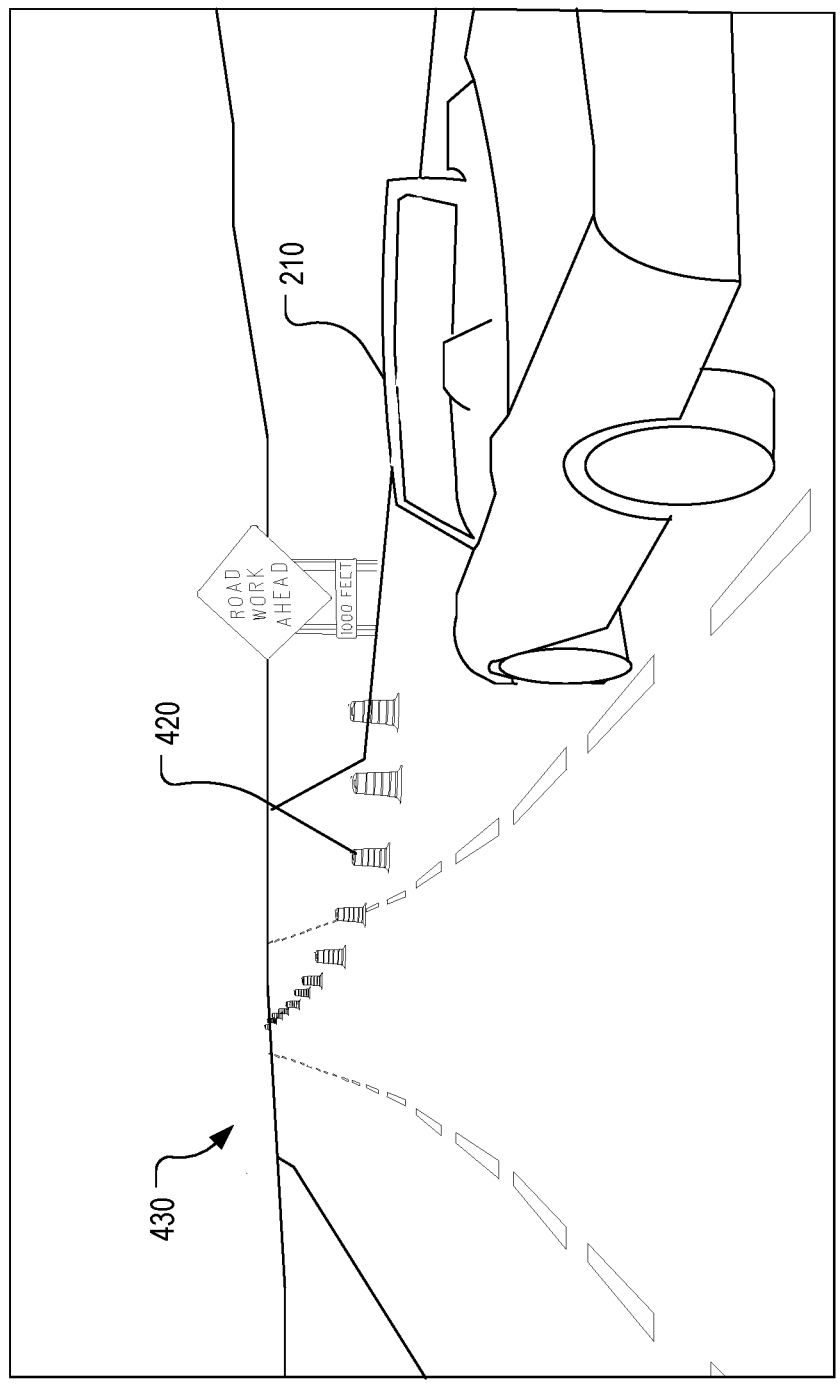
FIG. 4 illustrates an example operation of an autonomous vehicle in accordance with aspects of the disclosure.

FIG. 4 depicts an example of the operation of vehicle 210 in accordance with aspects of the disclosure. In this example, vehicle 210 is traveling on a road 430. Two of the lanes of the road are closed by road block 420 due to road construction. The vehicle 210 has to detect that the right two lanes are blocked and move to the leftmost lane.

Figure 5:
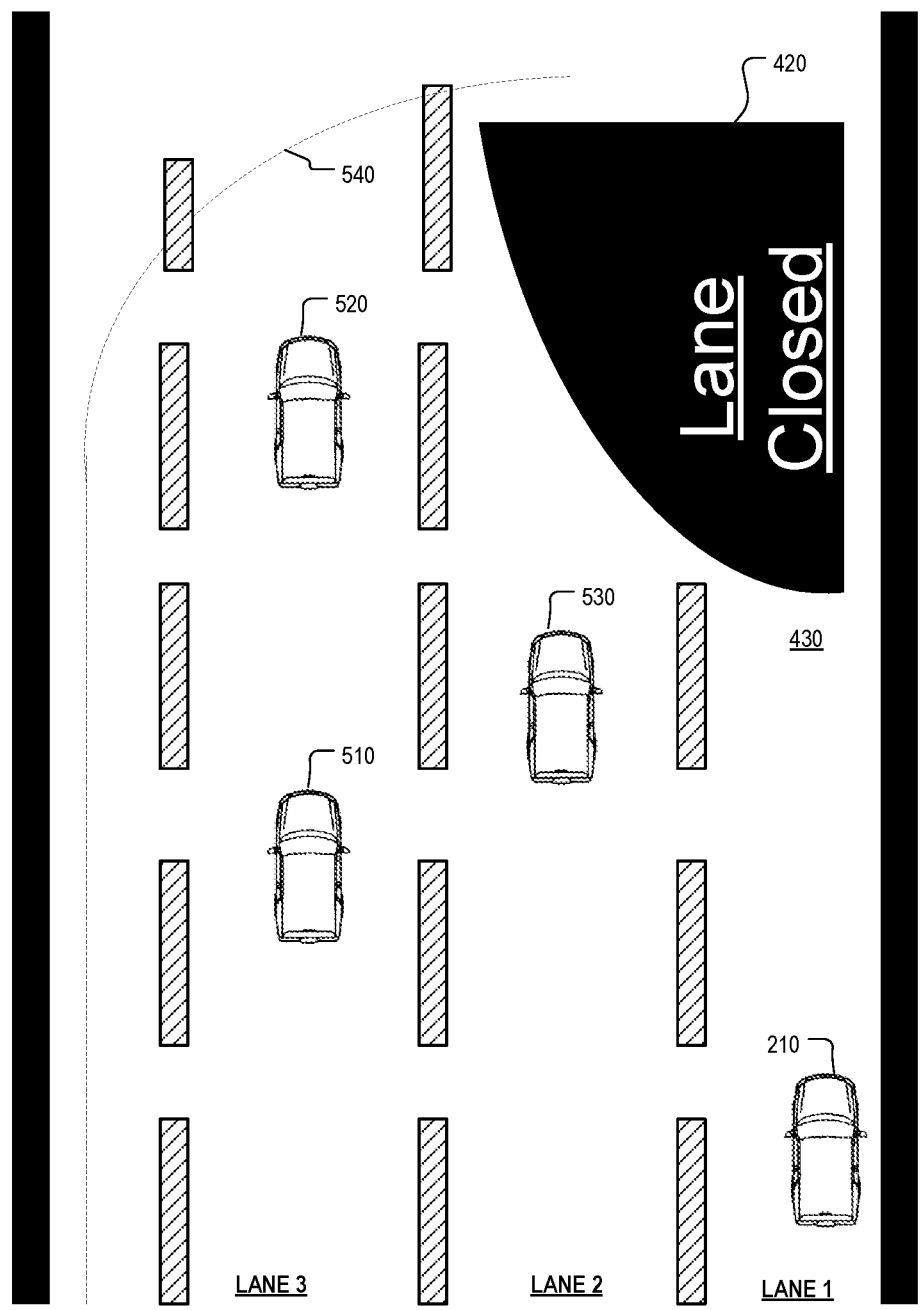
FIG. 5 illustrates further operation of the autonomous vehicle in accordance with aspects of the disclosure.

FIG. 5 shows an example where the vehicle 210 monitors the trajectories of vehicles 510-530 in order to detect that the rightmost two lanes of the road 430 are closed by road block 420. Although in this example the trajectories of three vehicles are monitored, vehicle 210 may monitor any number of vehicles (e.g., 1, 2, 10, 50). Each of the vehicles 510-530 may be selected for monitoring based on a number of criteria. In one aspect the vehicles may be selected based on being within a threshold distance from vehicle 210. In another aspect, the vehicles may be selected based on being within the range of a sensor (or camera) on vehicle 210. In yet another aspect, the vehicles may be selected based on them broadcasting a specific type of signal. The signal may be a signal indicating location of the vehicles or, alternatively, it may be a signal containing a vehicle identifier, such as VIN, serial number, MAC or another similar identifier. In one example, the vehicle identifier may identify vehicles as either being operated by human drivers or as autonomous vehicles. In that regard, in some aspects, the vehicle 210 may chose to follow the trajectories traveled by human-operated vehicles only or autonomously-operated vehicles only.

After selecting the vehicles 510-530 for tracking, vehicle 210 may observe their trajectories in a number of ways. In one example, vehicle 210 may use the camera 360 and image processing software to track the vehicles 510-530. In another example, curbside sensors may be used on the side of the road 430 to detect passing vehicles. In yet another aspect, the vehicles 510-530 may themselves transmit their geo-location to the vehicle 210. In yet another aspect, the vehicle trajectories may be obtained from the server 380. In other words, the vehicle 210 is not limited to any particular technique for tracking other vehicle's trajectories.

Figure 6C:
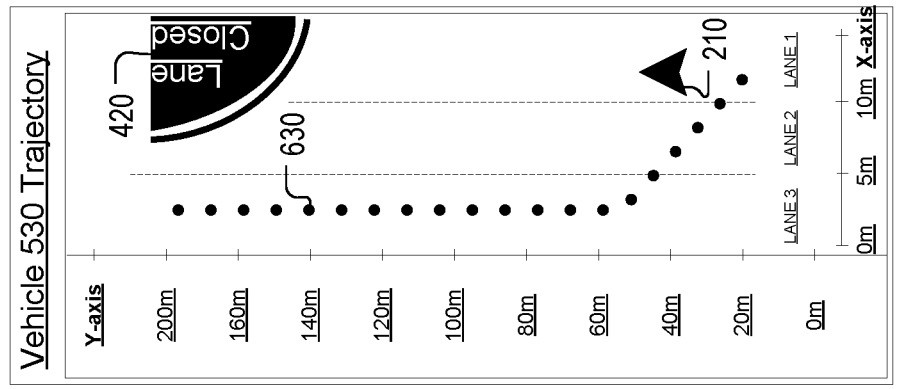
FIGS. 6A-C depict plots of trajectories of vehicles that share the road with the autonomous vehicle.
Figure 6B:
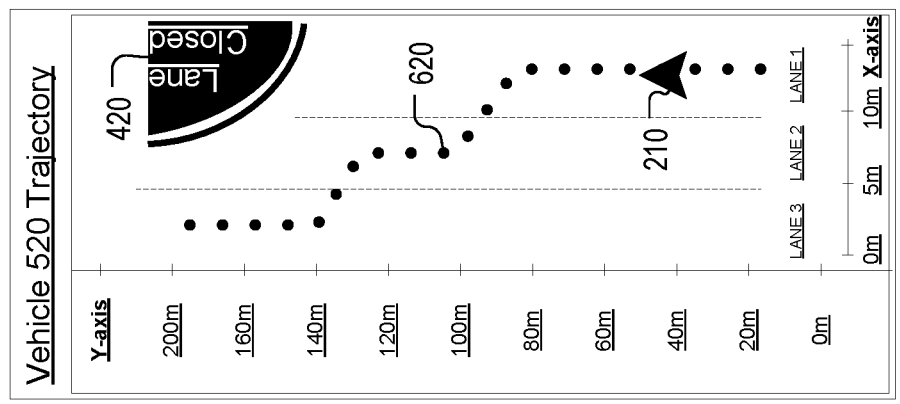
Figure 6A:
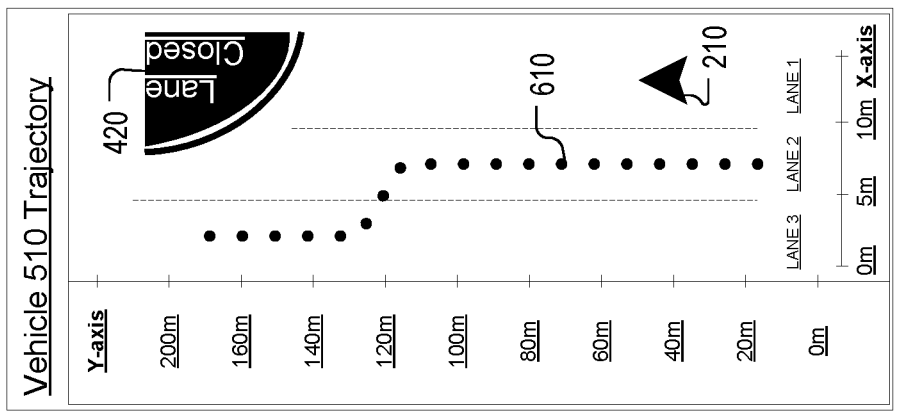

FIGS. 6A-C depict plots of trajectories of vehicles 510-530 that are observed by the vehicle 210. In one aspect, FIG. 6A depicts trajectory 610 of vehicle 510 as a collection of solid dots. Each solid dot represents a location passed by the vehicle 510. A location may be considered passed by the vehicle 510 if the vehicle 510 either drives over or through that location or within a predetermined distance from that location (e.g., 1 meter). Together all dots in the plot trace out a path traveled by the vehicle 510. In a similar fashion, the trajectories 620 and 630, depicted in FIGS. 6B and 6C, indicate the paths traveled by vehicles 520 and 530, respectively. In particular, the trajectory 620 indicates that the vehicle 520 stayed in right lane until the 80th meter of road stretch at which point it moved to the middle lane, stayed in the middle lane until it reached the 130th meter of road stretch, and then moved to the left lane of the road 430, thereby avoiding the road block 420. Similarly, the trajectory 630 indicates that the vehicle 530 moved from the right lane to the left before it reached the 60th meter of road stretch and thus it also avoided the road block 420. The arrowhead 210 depicted in FIGS. 6A-6C represents the position of the vehicle 210 at the time the trajectories 610-630 are processed in the manner discussed with respect to FIGS. 8A-8B.

Figure 7:
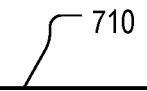
FIG. 7 depicts an example of a data structure that may be used to store vehicle trajectories in accordance with aspects of the disclosure.

FIG. 7 depicts an example of a data structure 710 representing the trajectory 610. In this example, the trajectory 610 is stored as a set of location samples. Each sample is taken at a different time instant. Each sampled location is represented by an X-coordinate and Y-Coordinate. In this example, the coordinate system is defined by a Y-axis running in parallel to the left curb of road (430) and the X-axis is normal to the Y-axis. It should be noted that the data structure 710 provides only an example of how vehicle trajectories (e.g., observed or generated) may be represented. In further examples, however, each of the vehicle trajectories may be represented as a set of vectors, collection of coordinates, a polynomial, or any other representation. The trajectories may be part of course estimates, road models, and other similar structures used by the vehicle control unit 220 in controlling the operation of the vehicle 210. Furthermore, although in this example locations in the trajectory 610 are represented as coordinate pairs, in other examples they may be represented as vectors, polynomials, or any other form capable of identifying a location in the environment of vehicle 210 (e.g., road 430 or areas outside the road 430). The present disclosure is not limited to any specific type of location representations.

Figure 8D:
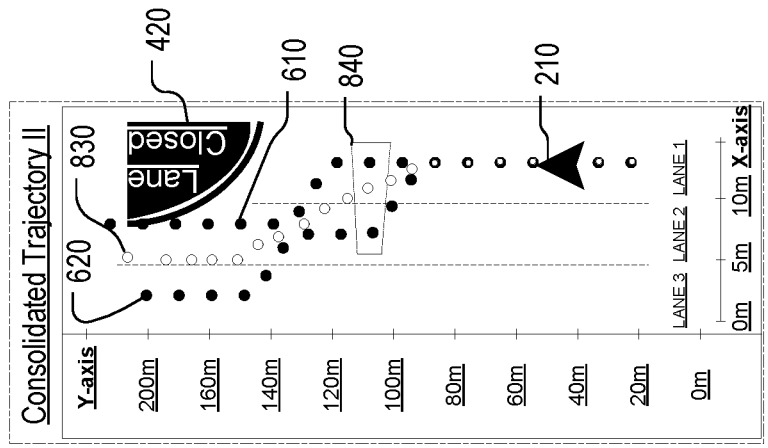
FIGS. 8A-E depict plots of the trajectories of vehicles that share the road with the autonomous vehicle, as well as trajectories that are generated by the autonomous vehicle.
Figure 8C:
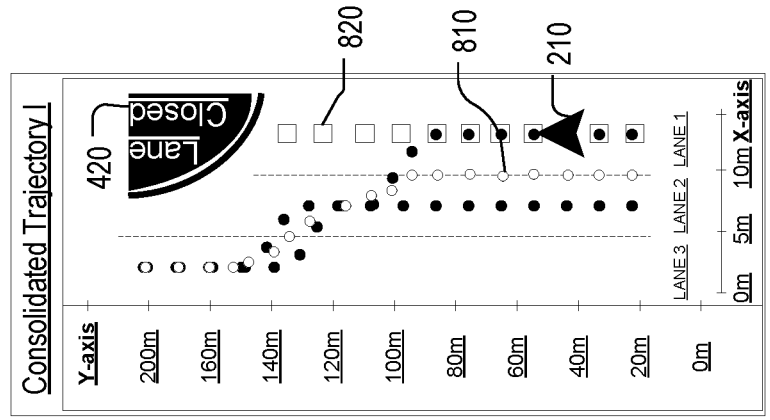
Figure 8B:
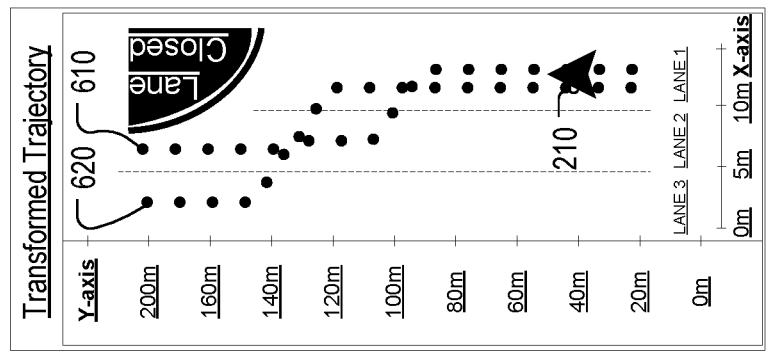
Figure 8A:
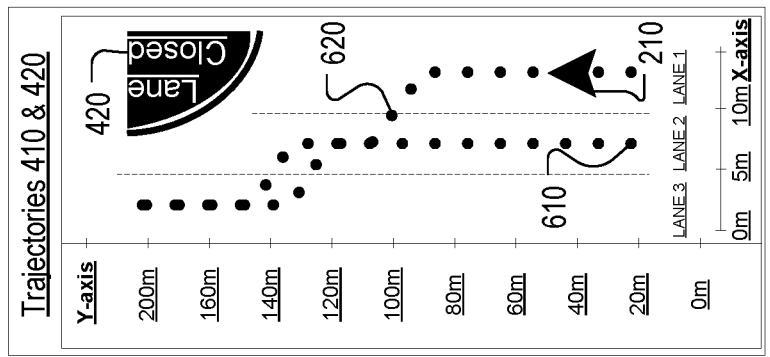

FIGS. 8A-B depict plots illustrating some of the processing performed on observed trajectories 610-620 in order to produce combined trajectories 810 and 830. FIG. 8A depicts a plot of observed trajectories 610 and 620. The plot also shows the location of vehicle 210 (as an arrowhead) relative to the road. As shown on the plot, the trajectory 620 originates in the lane where vehicle 210 is located, whereas the trajectory 610 originates in a different lane. Because it is located in a different lane, the trajectory 610 may be offset.

FIG. 8B depicts a plot of the trajectory 610 after it has been offset. The offsetting may involve identifying the location in trajectory 610 that is the closest, from among all locations in the trajectory 610, to the location of vehicle 210 and determining a distance between this location and vehicle 210. The distance may be a Euclidean distance, distance along the X-axis, distance along the Y-axis, or any other type of distance. The distance is added (or subtracted) to all other locations in the trajectory 610. As illustrated in FIG. 8B, when trajectory 610 is offset, it may be shifted from the center lane to the lane of vehicle 210. The end effect of the offsetting may be that the trajectories 610 and 620 are normalized into a single lane (e.g., the lane of vehicle 210) before being processed further.

FIG. 8C depicts an example of trajectories 810 and 820. Trajectory 810 is produced by combining trajectory 610 with trajectory 620. Trajectory 820 is generated based on information about the shape of the road 430 that is obtained from a map. In this example, the map is inaccurate and the trajectory 820 leads directly into the road block 420. By contrast, the combined trajectory 810 safely steers around the road block 420.

FIG. 8D depicts an example of a combined trajectory 830 that is produced by combining the offset version of trajectory 610 with trajectory 620. For each location in trajectory 610 a cluster of locations may be created that includes the location in the trajectory 610 and one or more corresponding locations from the trajectory 620. In one aspect, the corresponding locations may be selected based on being within a threshold distance from the location in trajectory 610. In another aspect, only the location that is the closest to the location in trajectory 610, from among a group of locations in trajectory 620, may be selected as a corresponding location. Although in this example the corresponding locations are clustered with a location from trajectory 610 based on distance(s) to the location in trajectory 610, in other examples the clusters of locations may be assembled based on another characteristic (e.g., location relative to a point outside of the road 430, successive distances).

Figure 8E:
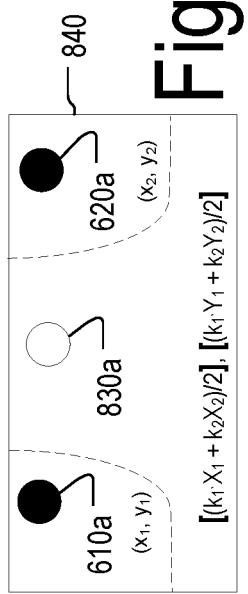

FIG. 8E depicts an example of locations 840 being combined. In particular, location 610a from trajectory 610 is combined with location 620a from trajectory 620 to produce a combined location 830a of combined trajectory 830. In one aspect, the combined location 830a is determined by averaging the locations 610a and 620a. For example, the coordinates $(X_3, Y_3)$ for location 830a may be calculated using the formula $X_3=(-X_1+X_2)/2$, $Y_3=(Y_1+Y_2)/2$, wherein $(X_1, Y_1)$ and $(X_2, Y_2)$ are the coordinates for the locations 610a and 620a. Although in this example, the combined location 830a is calculated by taking the average of locations 610a and 620a, in other examples any method for reducing a cluster of locations, to a single representative location may be used.

In another aspect, the value of the combined location 830a may be adjusted based on secondary information. The secondary information may indicate how reliable trajectories 610 and 620 are. For example the location 830a may be adjusted by weighing the coordinates of locations 610a and 620a with coefficients based on the secondary information. For example, the location 830a may be calculated by using the formula $X_3=(k_1X_1+k_2X_2)/2$, $Y_3=(k_1Y_1+k_2Y_2)/2$. If trajectory 610 is deemed extremely unreliable, the coefficient $k_1$ may set to 0 while $k_2$ is set to 2. In such case, no weight is given to the trajectory 610. In addition, each of the coefficients $k_1$ and $k_2$ may be set somewhere between 0 and 2, thereby adjusting the relative contributions of trajectories 610 and 620 without completely eliminating any one of them. Alternatively, the formulas $X_3=[(k_1X_1+k_2X_2)/(k_1+k_2)]$ and $Y_3=[(k_1Y_1+k_2Y_2)/(k_1+k_2)]$ may be used to guarantee normalization based on total weights. The coefficients k1 and k2, in this example, may have any possible value. It should be noted that using coefficient multiplication, in the manner discussed above, is only one of many possibly ways to incorporate secondary information into the calculations of combined locations.

The secondary information may include different reliability characteristics. In one aspect, the number of observed trajectories that are combined to generate a combined trajectory may indicate how reliable the combined trajectory is. The greater the number of observed trajectories, the more reliable the resultant combined trajectory. This is so because, in general, vehicles that are tracked may randomly change lanes without road 430 being blocked. The random lane changes may falsely indicate to vehicle 210 the presence of a road block. However, by increasing the sample of observed trajectories, the effects of random lane changes may be minimized.

In another aspect, the number of offset trajectories that are combined to generate a combined trajectory may indicate how reliable the combined trajectory is. The fewer the offset trajectories, the more reliable the combined trajectory. If all the observed trajectories originated from the same lane as the lane in which the vehicle 210 is located, the combined trajectory resulting from the observed trajectories may be considered more reliable. This is so because, unlike vehicles in other lanes, the vehicles in the lane of vehicle 210 face very similar road conditions to those encountered by vehicle 210.

In yet another aspect, the distribution of locations found in a trajectory may indicate how reliable the trajectory is. The statistical attributes may include variance (e.g., along the X-axis) standard deviation (e.g., along the X-axis), correlation between two sets of locations, standard error (in the set of locations of the combined trajectory), and so forth.

In another aspect, characteristics of a trajectory's curvature may indicate how reliable the trajectory is. Curvature characteristics may include, the angle of the sharpest turn found in a trajectory, the count of turns that cross a threshold (e.g., turns that are over 90°), the count of left turns, the count of right turns, the presence of patterns of left and right turns (e.g., left turn followed by a right turn followed by a right turn). For example, if a 100° turn is present in a trajectory, this may be an indication that there is an error and the trajectory is unreliable, as vehicles rarely turn 100° when driving on a highway.

In yet another aspect, discontinuities a trajectory may indicate how reliable the trajectory is. The less continuous a trajectory, the less reliable. Discontinuities may be identified based on a distance between successive locations in a given trajectory. The distance may be along the X-axis, Y-axis, Euclidean distance, or any other type of distance. Two locations may be said to be successive if they are located immediately one after another in an ordered set of locations.

For example, the locations in the ordered set may be arranged according to the time at which they are measured.

Referring back to FIG. 7, an example of an ordered set of locations is depicted in the table 710. The average distance between successive locations in table 710 is about +10 m. However, the distance between successive locations $t_9$ and $t_{10}$ is −50 m. A gap of such magnitude may, in some circumstances, be classified as a discontinuity. Thus, to determine how discontinuous a trajectory is, successive distances in the trajectory may be compared against a threshold. The threshold may be a constant (e.g., 50 m) or it may be based on a statistical measure of the successive distances in the set of locations (e.g., standard deviation). Moreover, the amount of discontinuity in a trajectory may be qualified based on a count of the discontinuities or the value of one or more statistical attributes of the set of successive distances between locations in the trajectory (e.g., average successive distance, standard deviation).

Referring back to FIG. 8E, the reliability characteristics discussed above may be used in calculating (or adjusting) the value of combined location 830*a*. In one example, the value of coefficient $k_1$ may be based on one or more reliability characteristics of trajectory 610 and the value of coefficient $k_2$ may be based on one or more reliability characteristics of trajectory 620. Furthermore, the reliability characteristics may be used to determine whether at all to use a given trajectory (e.g., combined or observed) in controlling the operation of the vehicle 210.

Figure 9:
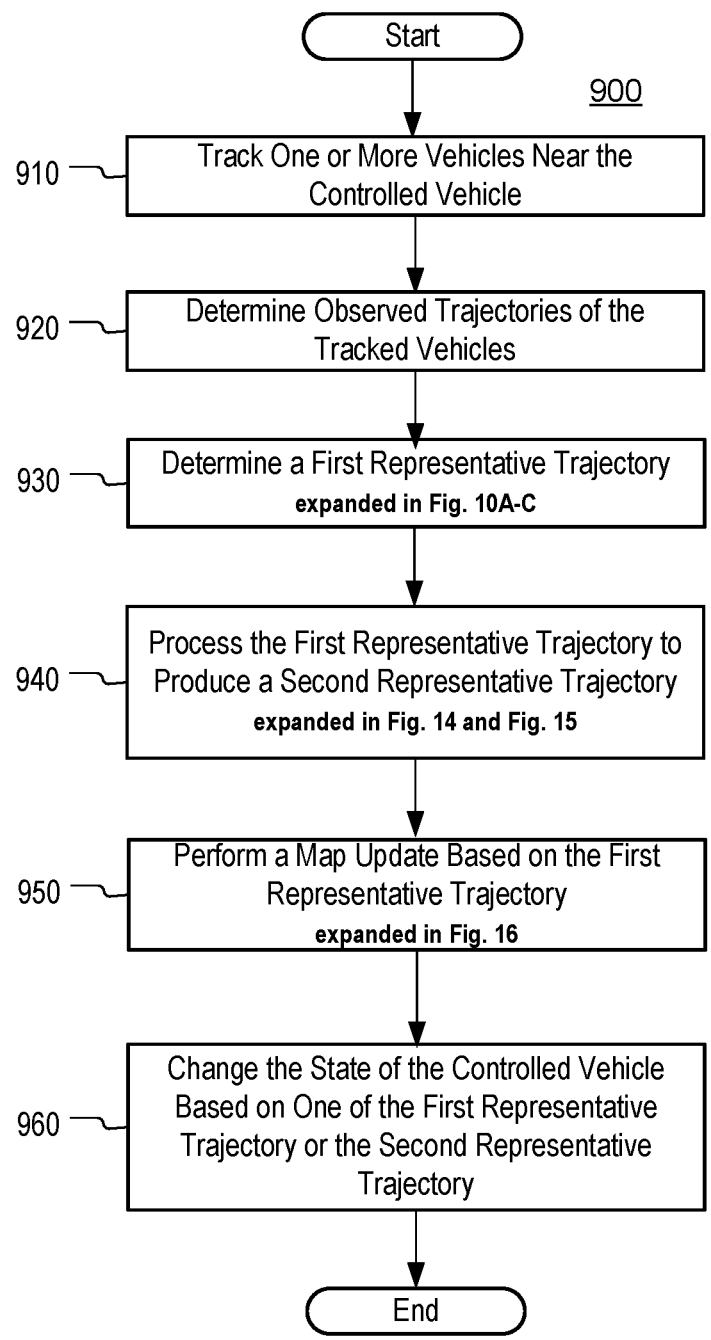
FIG. 9 depicts a flowchart of a process in accordance with aspects of the disclosure.
Figure 10:
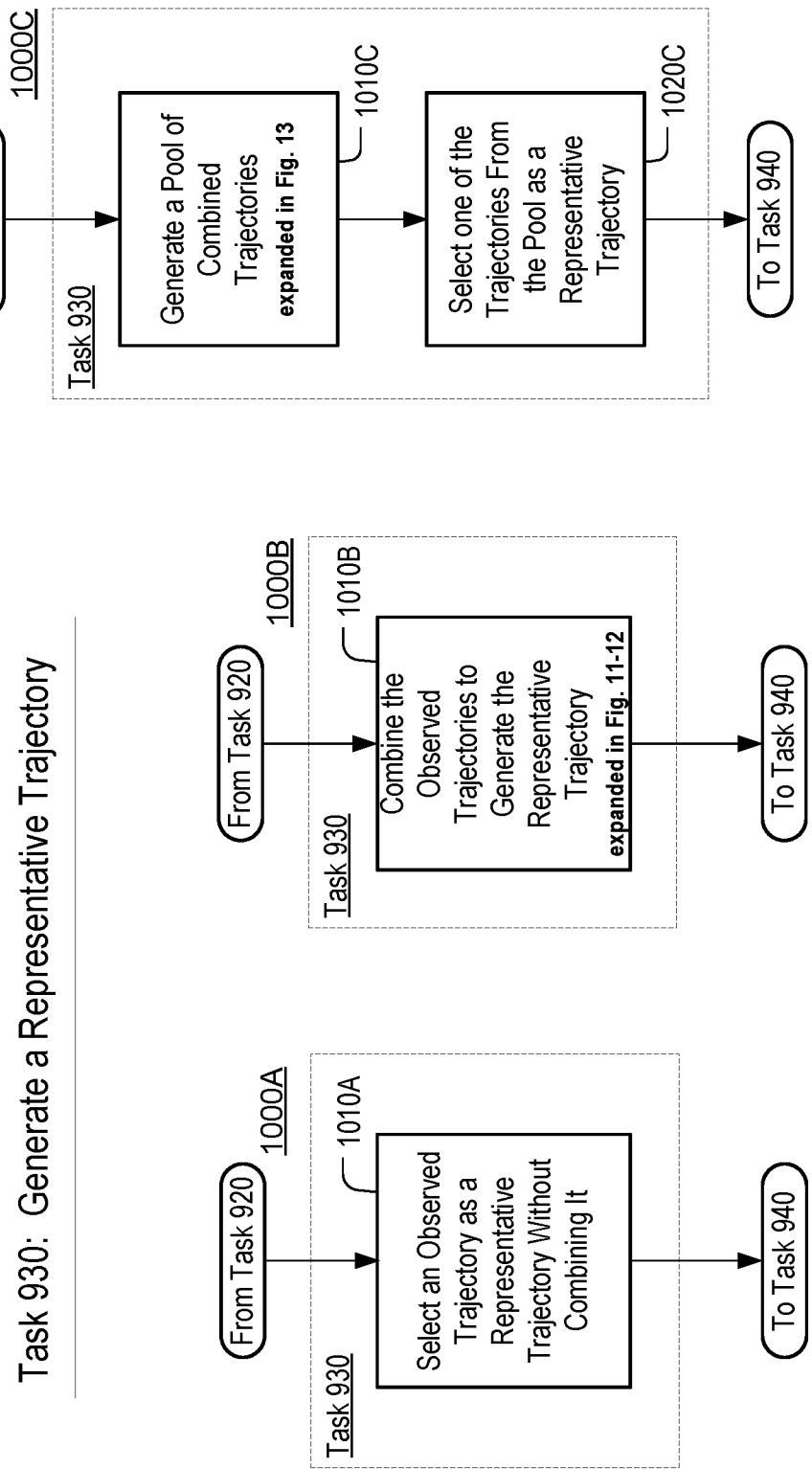
FIGS. 10A-C depict flowcharts of sub-processes associated with FIG. 9 in accordance with aspects of the disclosure.

FIG. 9 depicts a flowchart of a process 900 for controlling the operation of vehicle 210 by tracking other vehicles' trajectories. At task 910, one or more vehicles are tracked. At task 920, observed trajectories of the tracked vehicles are obtained. At task 930, two or more of the observed trajectories are processed to generate a first representative trajectory. The generation of the first representative trajectory is discussed further below with respect to FIGS. 10A-C. At task 940, the first representative trajectory is processed to produce a second representative trajectory. The production of the second representative trajectory is discussed further below with respect to FIGS. 14 and 15.

At task 950, a map update is performed. In one aspect, a trajectory may be generated based on information from a map (e.g., trajectory 820). The generated trajectory may be compared against the first representative trajectory (e.g., trajectory 830). When the two trajectories are found to be inconsistent, the map may be updated. Task 950 discussed further below with respect to FIG. 16.

At task 960, vehicle control unit 220 changes the state of the vehicle 210 based on one of the first representative trajectory or the second representative trajectory. In one aspect, vehicle control unit 220 may switch the vehicle 210 to a different control mode. Vehicle may switch to a mode in which it starts relying on cameras and other sensors more heavily. In another aspect, vehicle 210 may begin following the either the first or second representative trajectory. For example, vehicle control unit 220 may change one of the speed or direction of the vehicle 210 based on one of the representative trajectories. Vehicle 210 may change lanes to avoid road block 420 or alternatively it may slow down. In yet another aspect, the representative trajectory (first or second) may be included in a control strategy, course estimate, road model, or another similar data structure that is used by the vehicle control unit 220 in controlling the operation of vehicle 210.

FIGS. 10A-C are flowcharts of exemplary sub-processes for generating the first representative trajectory as specified by task 930 of FIG. 9. FIG. 10A depicts exemplary sub-process 1000A in which an observed trajectory is selected for use as a representative trajectory (task 101A). In one aspect, the trajectory may be selected from a group including observed trajectories, offset versions of the observed trajectories, or both. In another aspect, the selection may be performed according to a selection criterion. The selection criterion may be based on the reliability of the trajectories in the group. For example, the selection criterion may provide that the observed trajectory with the least amount of discontinuity be selected. The selection criterion may be based on reliability characteristics such as those discussed above. Here the observed trajectory may be selected as the representative trajectory without combining it with another trajectory.

FIG. 10B depicts a flowchart of a process 1000B in which two or more of the observed trajectories in a group are combined to produce a representative trajectory (task 1010B). The group may include observed trajectories, offset versions of the observed trajectories, or both. The manner in which the observed trajectories are combined is discussed further below with respect to FIGS. 11-12.

FIG. 10C depicts an exemplary sub-process 1000C in which a representative trajectory is selected from a pool of combined trajectories. At task 101C, a group of observed trajectories is combined to produce a pool of combined trajectories. The group of observed trajectories being combined may include observed trajectories, offset versions of the observed trajectories, or both. The resulting pool of combined trajectories may include combined trajectories that are generated in a different manner from one another. In one aspect, combined trajectories in the pool may be generated based on different subsets of the group of trajectories. In another aspect, each of the combined trajectories in the pool may be generated by executing an expectation-maximization (EM) process. The EM process is further discussed below with respect to FIG. 12.

At task 1020C, a trajectory from the pool is selected as a representative trajectory. The criterion used for the selection may be based on one or more of trajectory characteristics that indicate reliability. Exemplary criteria include:

R1: Select the combined trajectory that is generated based on the largest number of observed trajectories.

R2: Select the combined trajectory that is generated based on the smallest number of offset observed trajectories.

R3: Select a combined trajectory that has the smallest standard error associated with the combined trajectory's set of locations.

R4: Select a trajectory where no turn exceeds a predetermined threshold angle (e.g., 90°).

R5: Select the combined trajectory with the lowest amount of discontinuity.

It should be noted that the criteria above are provided as examples only. Furthermore, it should be noted that two or more of the criteria may be combined together.

Figure 11:
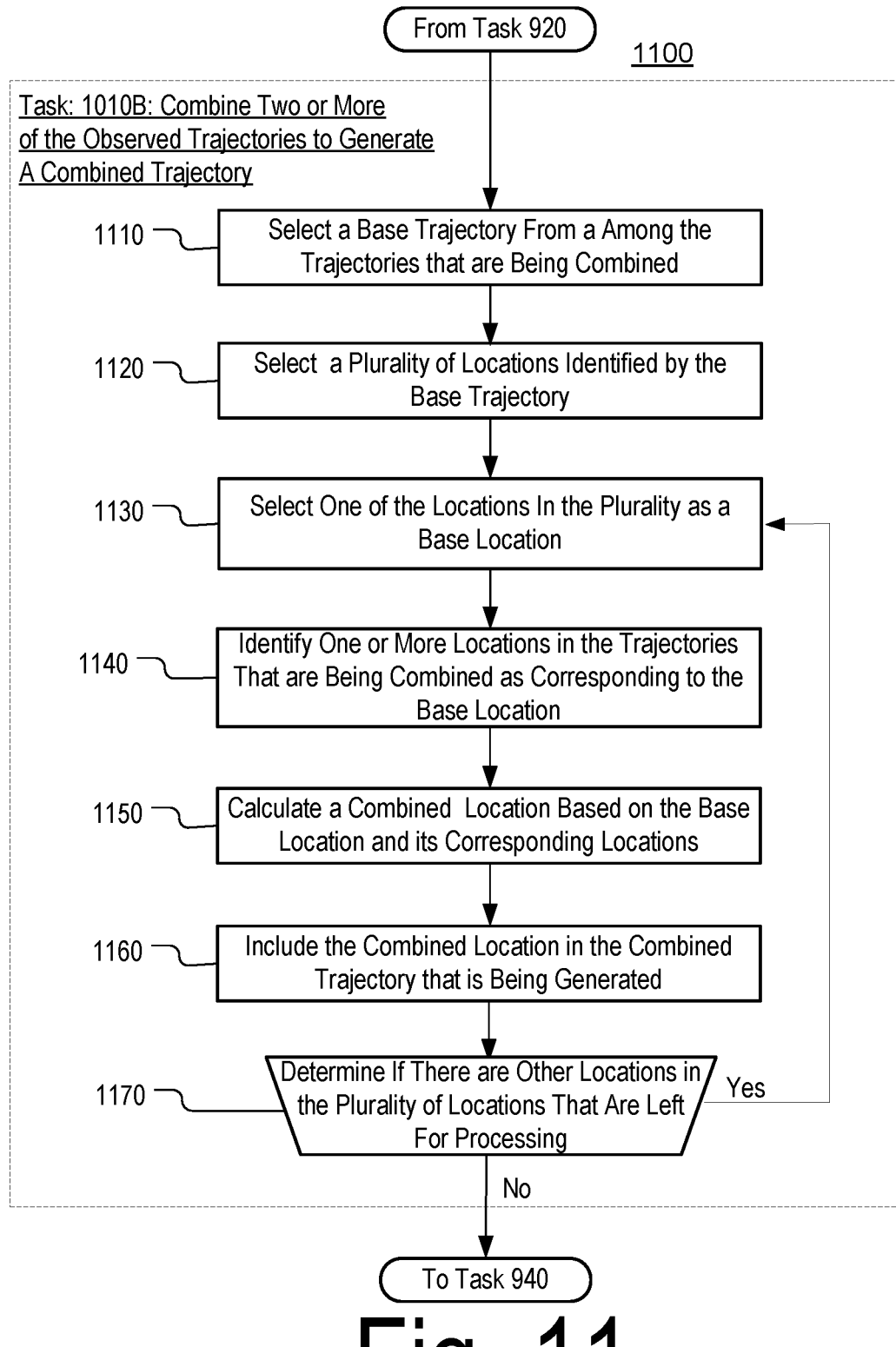
FIG. 11 depicts a flowchart of sub-tasks associated with FIGS. 10A-C.

FIG. 11 depicts a flowchart of a sub-process 1100 for combining two or more observed trajectories of vehicles that are tracked as shown by task 1010B of FIG. 10B. At task 1110, a trajectory is selected as a base trajectory from the trajectories that are being combined. At task 1120, a plurality of locations that are part of the base trajectory is determined. At task 1130, a location from the plurality is selected as a base location. In this example, location 610*a* may be selected. In one aspect, each location identified by the base trajectory may be selected as a base location only once during the execution of the sub-process 1100.

At task 1140, a cluster of one or more locations is determined. The cluster may include locations from all trajectories that are being combined except for the base trajectory. In one aspect, the cluster may include locations that are within a predetermined distance from the base location. In another aspect, the cluster may include only one location from each trajectory that is being combined. The latter location may be the location closest to the base location from among a group of locations in the trajectory to which the latter location belongs. Thus, at task 1140, trajectories that are being combined (e.g., trajectory 620) may be processed to identify locations that are within a predetermined distance from (or the closest to) the base location. The distance measured may be distance along X-axis, distance along Y-axis, Euclidean distance, or any other type of distance. In the present example, location 620*a* may be selected.

At task 1150, a combined location is calculated based on the base location and the locations from the cluster determined at task 1140. The combined location may be generated in the manner discussed with respect to FIG. 8E. For instance, the combined trajectory may be an average of the base location and locations from the cluster. In this example, locations 610*a* and 620*a* may be combined to generate combined location 830*a*.

At task 1160, the combined location is included in the combined trajectory that is being generated. In the present example, combined location 830*a* is added to the trajectory 830. At task 1170, it is determined whether additional locations from the plurality of locations determined at task 1120 remain to be processed. If yes, task 1130 is executed with another location from the base trajectory being selected as the "base" location. In some aspects, task 1130 may be repeated once for every location in the plurality of locations determined at task 1120. When task 1130 is not to be repeated any more, the execution of the process 1100 is finished.

Figure 12:
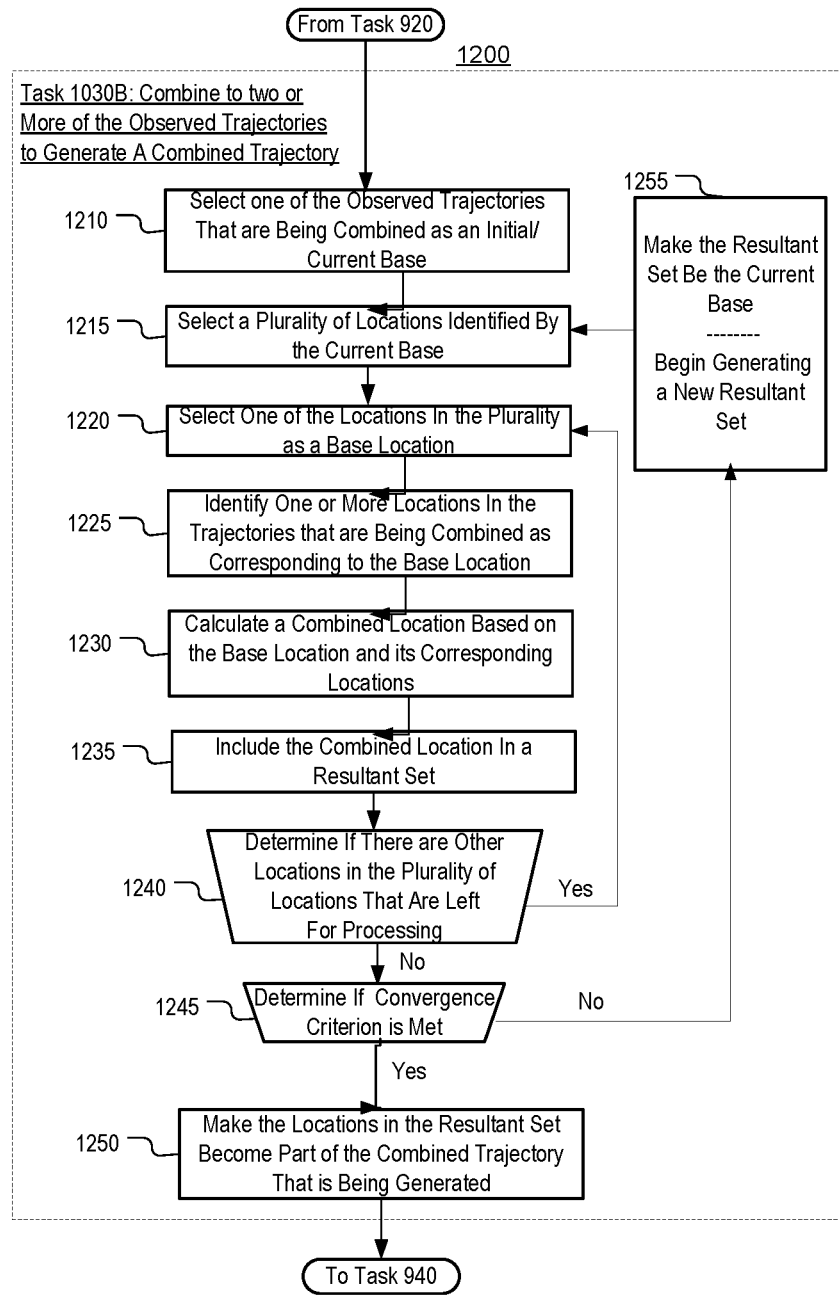
FIG. 12 depicts another flowchart of sub-tasks associated with FIGS. 10A-C.

FIG. 12 depicts a flowchart of sub-process 1200 for combining two or more observed trajectories of vehicles that are tracked as shown by task 1010B of FIG. 10B. At task 1210, one of the observed trajectories that are being combined is selected as an initial base. At task 1215, a plurality of locations included in the base is determined. The plurality may include all or a portion of the locations in the base. At task 1220, a location from the plurality is selected as a base location. In one aspect, each location in the plurality identified at task 1215 may be (or is) selected as a base location only once.

At task 1225, a cluster of one or more locations is determined. The cluster may include locations from all trajectories that are being combined. However, during the first iteration of the process 1200, the cluster does not include locations from the trajectory selected as a base at task 1210. In one aspect, the cluster may include locations that are within a predetermined distance from the base location. In another aspect, the cluster may include only one location from each trajectory that is being combined. The latter location may be the location closest to the base location from among a group of locations in the trajectory to which the latter location belongs. Thus, at task 1225, trajectories that are being combined (e.g., trajectory 620) may be processed to identify locations that are within a predetermined distance from (or the closest to) the base location. The distance measured may be distance along X-axis, distance along Y-axis, Euclidean distance, or any other type of distance.

At task 1230, a combined location is calculated based on the base location and the cluster of locations determined at task 1225. The combined location may be generated in the manner discussed with respect to FIG. 8E. For example, the combined trajectory may be an average of the base location and locations from the cluster. At task 1235, the combined location is included in a current resultant set.

At task 1240, it is determined whether additional locations from the plurality determined at task 1215 remain to be processed. If yes, task 1220 is executed with another location being selected as the "base" location. In some aspects, task 1220 may be repeated once for every location in the set of locations determined at task 1215. When task 1220 is not to be repeated, task 1245 is performed.

At task 1245, it is determined whether a convergence criterion is met. In one aspect, the convergence criterion may be based on a number of iterations. For example, the convergence criterion may specify that tasks 1210-1240 may be repeated five times at most. In another aspect, the convergence criterion may be based on a distance between the current resultant set and a resultant set generated in a previous iteration. For example, the difference may be determined based on a distance between a first location in the current resultant set and a location from a resultant set that generated in a previous iteration (e.g., the most recent resultant set). If it is determined that the convergence criterion is met, the locations in the current resultant set are included in the combined trajectory that is being generated at task 1250. Otherwise, task 1255 is executed.

At task 1255, the current base is changed. In particular, the current resultant set is made the current base. Afterwards, a new resultant set is generated. The new resultant set includes combined locations that are generated by combining "base locations" from a previously-calculated resultant set with the observed trajectories that are being combined. Thus, the resultant set that is the outcome of each "outer loop" iteration of the process 1200 is refined in subsequent iterations by being combined again and again with the same set of observed trajectories of vehicles that are being tracked.

Figure 13:
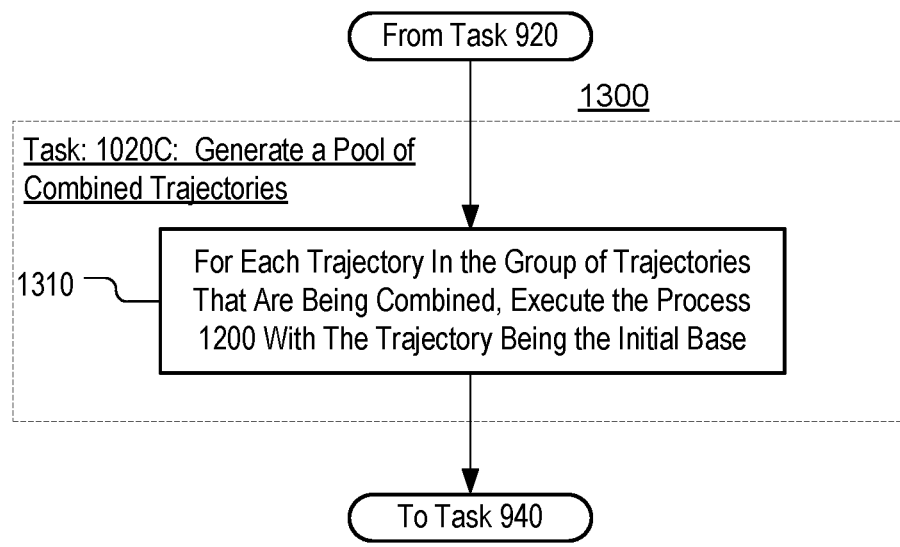
FIG. 13 depicts a further flowchart of sub-tasks associated with FIGS. 10A-C.

FIG. 13 depicts an example sub-process 1300 for generating a pool of combined trajectories as specified by task 1020B. The pool of combined trajectories is generated based on a set of observed trajectories (task 1310). The process 1200 is executed multiple times. Every time the process 1200 is executed, a different trajectory from the set of combined trajectories is used as an initial base (e.g., at task 1210). The combined trajectory resulting from each execution is added to pool of combined trajectories. Thus, in one aspect, all combined trajectories in the pool may be generated by combining the same trajectories, but with a different trajectory used as an initial base in the process 1200.

Figure 14:
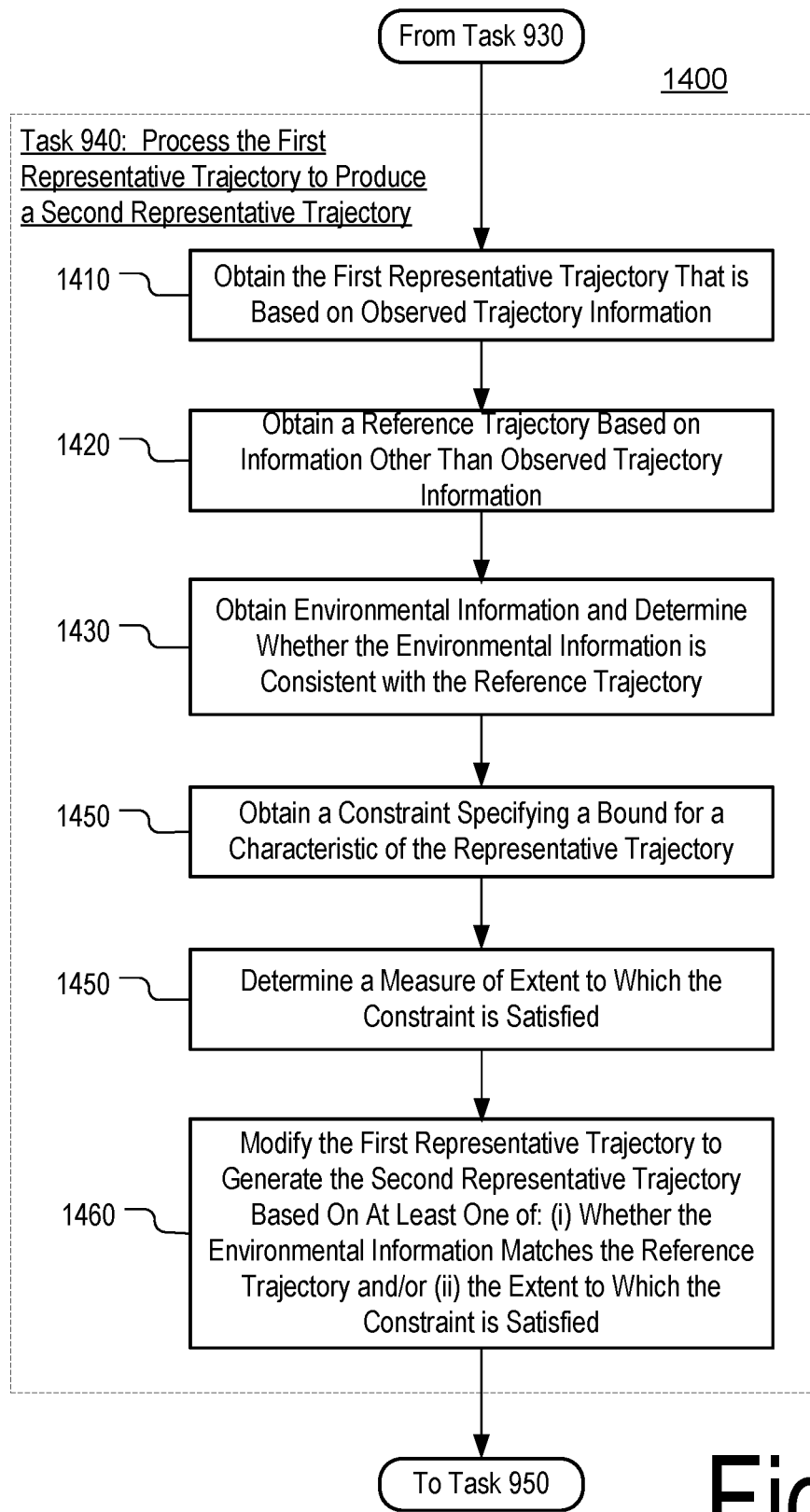
FIG. 14 depicts a flowchart of sub-tasks associated with FIG. 9.

FIG. 14 depicts an exemplary sub-process 1400 for processing the first representative trajectory to produce a second representative trajectory as specified at task 940 of FIG. 9. At task 1410, the first representative trajectory determined at task 930 is obtained. At task 1420, a reference trajectory is obtained that is generated based on information other than vehicle trajectory information. In one aspect, the reference trajectory may be generated based on a representation of the road 430 found in a map that is stored in memory 320. In another aspect, the backup trajectory may be generated by processing information from sensor 370 and camera 360. The reference trajectory may be generated by using any known method for generating vehicle trajectories, course estimates or vehicle control strategies.

At task 1430, environmental information is obtained using, e.g., camera 360 and/or sensor 370. The environmental information may include locations of k-rails, obstacles, cones, and other features that provide information about whether the road 430 is blocked. After the environmental information is obtained, a determination is made of whether the environmental information is consistent with the reference trajectory. For example, if obstacles or cones are detected in the path of the reference trajectory, a determination may be made that the environmental information is inconsistent with the reference trajectory. When the reference trajectory is inconsistent with the environmental information, that may be a sign that the reference trajectory is inaccurate and therefore the first (or second) representative trajectory, that is generated based on observed trajectories of other vehicles, should be used in controlling the operation of the vehicle 210.

At task 1440, a constraint is obtained. In one aspect, the constraint may specify bounds or a limit for a characteristic of the first representative trajectory. The characteristic may be one of the characteristics that indicate reliability (e.g., curvature characteristic, discontinuity characteristic). For example, the constraint may specify that no turn in a trajectory should exceed ninety degrees. As another example, the constraint may specify, that the amount of discontinuity should not exceed a pre-determined threshold. As yet another example, the constraint may specify that the number of turns in a given stretch of road (e.g. 200 m of road) should not exceed a pre-determined number. As yet another example, the constraint may specify that no more than two offset trajectories may be used in generating the first representative trajectory.

In another aspect, the constraint may specify ranges for the locations in a given trajectory. For example, the constraint may specify that the horizontal positioning of all locations in a trajectory falls within the ranges (2 m-3 m), (7 m-8 m), (9 m-10 m). These ranges, as FIGS. 6A-C illustrate, may fall within the center portions of the different lanes in road 430.

In yet another aspect, the constraint may require a degree of similarity between the representative trajectory and target trajectory. The target trajectory may be the reference trajectory, an observed trajectory, an observed trajectory that is used in generating the first representative trajectory, or any other trajectory. The similarity may be defined in terms of distance between a first location in the first representative trajectory and a corresponding second location in the target trajectory. The corresponding location may be the location in the representative trajectory that is the closest to the first location from among a group of locations in the target trajectory. As another example, the similarity may be defined in terms of an average distance between a group of locations in the first trajectory and their corresponding counterparts in the second trajectory. As yet another example, the similarity may be defined in terms of curvature. For instance, the constraint may require that for a turn in the first representative trajectory having a given characteristic (e.g., turn angle, starting location, ending location), there be a corresponding turn in the target trajectory that has a characteristic that matches the characteristic of the turn of the first representative trajectory.

In yet another aspect, the constraint may require that the first representative trajectory be within a threshold distance from the vehicle 210. For example, the constraint may specify that the closest point in the first representative trajectory is no further than a threshold distance from vehicle's 210 location.

At task 1450, it is determined whether the constraint is met. In one aspect, a measure of the extent to which the constraint is met is generated. The measure may be a binary value indicating that the constraint is either met or not met (e.g., m=1 may indicates that a constraint is met, whereas m=0 indicates that a constraint is not met). Alternatively, the measure may indicate the degree to which the constraint is met. For example, if the constraint specifies that at least 10 observed trajectories have to be used in generating the first representative trajectory, whereas only 9 have been used, then the measure may indicate that the constraint is barely not met. Alternatively, if the representative trajectory is generated based on five observed trajectories, then the measure may have a different value indicating that the constraint is missed by a greater margin (e.g., m=0.9 indicates that the constraint is missed by a 10% margin, m=0.5 indicates that the constraint is missed by 50% margin, and m=1.1 indicates that the constraint is exceeded by a 10% margin).

At task 1460, the first representative trajectory is modified to produce a second representative trajectory. In one aspect, the modification may involve adjusting one or more of the locations that are part of the first representative trajectory. For example, a location in the first representative trajectory having coordinates (X,Y) may be replaced with a location in the second representative trajectory having coordinates (k1*X, k2*Y), wherein the coefficient k1 and k2 may depend on the measure of extent to which the constraint is met. As another example, referring to FIG. 8C, trajectory 810 may be shifted from the centerline dividing lane 1 and lane 2 to lane 2. The present disclosure is not limited to any particular method for adjusting one or more of the locations.

In another aspect, the first trajectory may be combined with the reference trajectory to generate the second representative trajectory. The combination may be performed in the manner discussed above with respect to FIGS. 11 and 12. For example, each of the locations in the second representative trajectory may be determined by selecting a point in the first representative trajectory, identifying a corresponding point in the reference trajectory, and calculating their average.

In another aspect, the average may be adjusted based on the measure of the extent to which the first representative trajectory meets the constraint and/or the determination of whether the environmental information determined at task 1420 supports the first trajectory. For example, the average of a first location from the first representative trajectory, having coordinates $(X_1, Y_1)$, and a second location from the reference trajectory, having coordinates $(X_2, Y_2)$, may be calculated by using the formula $X_3=(k_1 X_1+k_2 X_2)/2$, $Y_3=(k_1 Y_1+k_2 Y_2)/2$. As another example, if the environmental information is inconsistent with the first map, the coefficient $k_1$ may be set to 0 while the coefficient $k_2$ is set to 2, in this case, no weight is given to the reference trajectory. Similarly, if any of the constraints are violated, the coefficient $k_2$ may set to 0 while $k_2$ is set to equal 2. In this case, case no weight is given to the first representative trajectory.

Furthermore, each of the coefficients $k_1$ and $k_2$ may be set somewhere between 0 and 2, adjusting the contribution of the first representative trajectory and the first trajectory with respect to calculating the second representative trajectory without completely eliminating it. For instance, if the measure of the extent to which a constraint is met is 0.9, $k_1$ may be set to equal this value thereby lowering the contribution of the first representative trajectory without completely eliminating it.

Stated succinctly, the second representative trajectory that is generated at task 1460 may be based on the first representative trajectory only, the reference trajectory only, or both the representative trajectory and the reference trajectory. In that regard, at a high level of abstraction, the process 1400 determines to what extent vehicle 210 is to rely on the trajectories of other vehicles on the road 430 or on conventional information, such as maps, sensor feedback, and so forth. The determination is made based on decisions about whether constraints are met and information from cameras, laser scanners, and other similar sensors.

Figure 15:
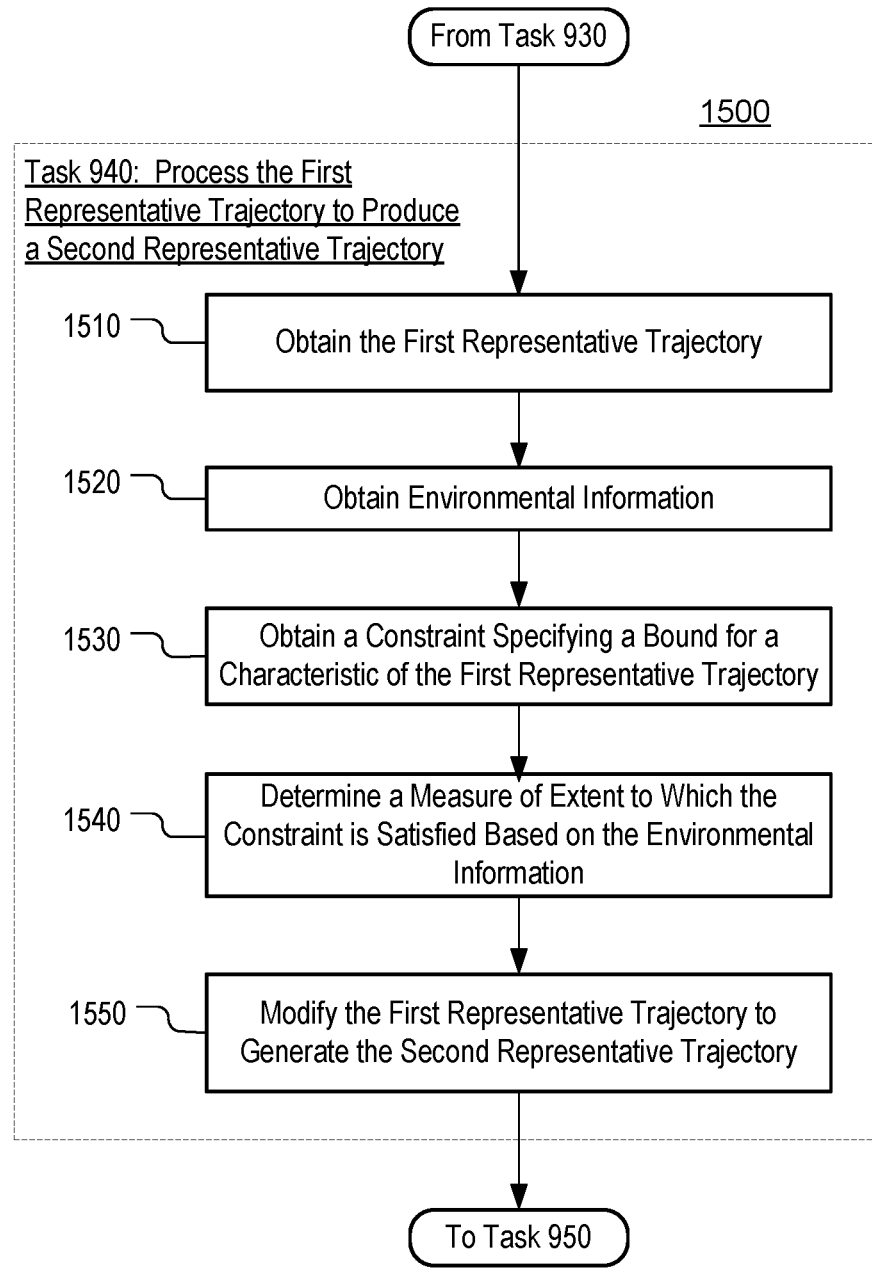
FIG. 15 depicts another flowchart of sub-tasks associated with FIG. 9.

FIG. 15 depicts an exemplary sub-process 1500 for processing the first representative trajectory to produce a second representative trajectory, as specified by task 960 of FIG. 9. In some aspects, the second representative trajectory may be an improved version of the first representative trajectory. At task 1510, the first representative trajectory determined at task 930 is obtained. At task 1520, environmental information is obtained using, e.g., camera 360 and/or sensor 370. The environmental information may include locations of k-rails, obstacles, cones, and other features that provide information about whether the road 430 is blocked. Task 1520 is identical to task 1430.

At task 1530, a constraint, is obtained. In one aspect, the constraint may specify bounds or a limit for a characteristic of the first representative trajectory. The obtained constraint may be any of the constraints discussed with respect to task 1440, such as a constraint that specifies ranges for locations in the first representative trajectory or a constraint based on the number of turns in the first representative trajectory. In some aspects, the constraint may require a consistency between the first representative trajectory and the environmental information obtained at task 1520. For example, the constraint may specify that no location in the first representative trajectory should be closer than a predetermined distance from an obstacle on the road that is detected using the camera 360 or sensor 370.

At task 1540, it is determined whether the constraint is met. In one aspect, a measure of the extent to which the constraint is met is generated. The measure may be a binary value indicating that the constraint is either met or not met, or alternatively, it may be a value indicating the degree to which the constraint is met. At task 1550, the first representative trajectory is modified to produce a second representative trajectory. The second representative trajectory, as noted, may be an improved version of the first representative trajectory and its generation may involve adjusting one or more of the locations that are part of the first representative trajectory. For example, a location in the first representative trajectory having coordinates (X,Y) may be replaced in the second representative trajectory with a location having coordinates ($k_1$*X, $k_2$*Y), wherein the coefficients $k_1$ and $k_2$ may depend on environmental information obtained at task 1520 or a measure of extent to which a constraint obtained at task 1530 constraint is met. It should be noted that the process 1500 is an example of one of many possible ways of combining information regarding observed vehicle trajectories with additional (environment) information in order to produce an improved trajectory estimate.

Figure 16:
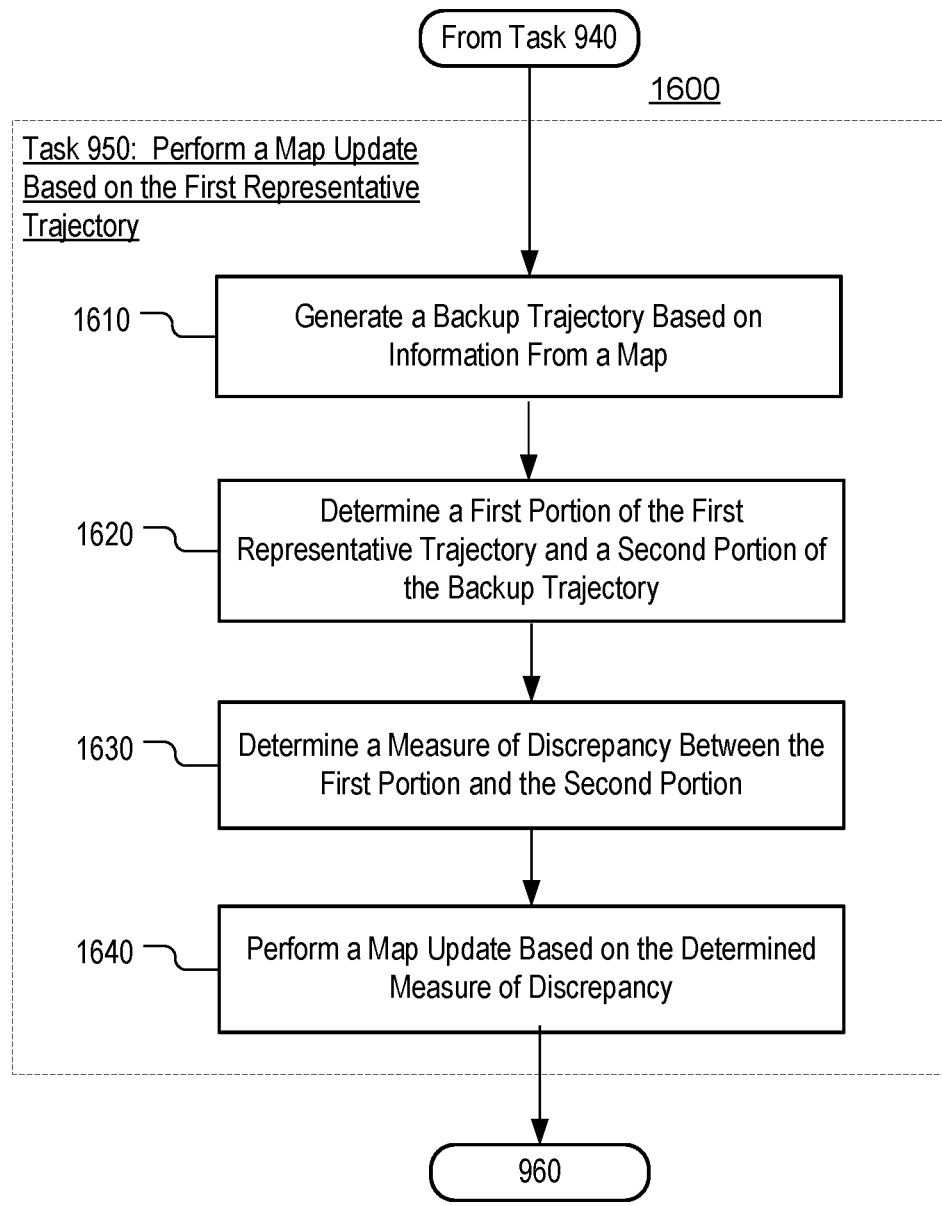
FIG. 16 depicts a yet another flowchart of sub-tasks associated with FIG. 9.

FIG. 16 depicts an example sub-process 1600 for performing a map update as specified by task 960 of FIG. 9. At task 1610, a backup trajectory is generated based on information from a map. At task 1620, a first portion of the first representative trajectory (generated at task 930) is identified along with a second portion of the backup trajectory. The first portion may include all or fewer of the locations in the first trajectory. The second portion may include all or fewer of the locations in the backup trajectory.

At task 1630, a measure of discrepancy is determined between the first portion and the second portion. In one aspect, the measure is based on distance between locations in the two portions. For example, the measure may be based on the distance between a first location from the first portion and location(s) from the second portion that correspond to the first portion (e.g., distance to the closest of all locations). In another aspect, the measure may be based on the average distances between locations in the first portion and their corresponding locations in the second portion. In yet another aspect, the measure may be based on characteristics of turns indicated by the first trajectory (e.g., location, angle). The greater the one of the above distances, the greater the measure of the discrepancy. Similarly, the greater the difference in the characteristics of correspond turns in the two portions, the greater the measure of discrepancy.

At task 1640, a map update may be performed. In one aspect, the map update is performed only if the measure of discrepancy determined at task 1640 exceeds the threshold. For example, if any of the calculated distances (e.g., average distance or distance between two points is greater than 10 meters, the map update is performed). In one aspect, the map update may involve modifying a map that is stored in memory 320 to show that the road 430 is likely blocked, changing a representation of the shape of the geometry (e.g., shape) to conform to the shape of the representative trajectory, or storing an indication in memory 320 that the map is inaccurate. In yet another aspect, performing an update may involve transmitting a message to the server 380 instructing to modify a map or simply alerting it that the map may be inaccurate.

FIGS. 1-16 are provided as examples only. At least some of the tasks may be performed in a different order than represented, performed concurrently or altogether omitted. In should be noted that the ideas and concepts of this disclosure may find application in traction control systems, collision detections systems, and other passive or active systems found in vehicles. Furthermore, the vehicle trajectory information may be used to update road maps or for real-time road conditions monitoring. Moreover, the aforementioned features may be implemented either in software as part of instructions 330 executed by a processing device, such as a processor, or in hardware (e.g., using FPGA), or both in software and hardware. The present disclosure is not limited to any particular software or hardware implementation.

Regarding the combination of locations from an observed trajectory to obtain a combined location, although the above discussion focuses on combining points from a group including a base point and at least one corresponding point by calculating an average location, the present disclosure is not limited to this approach. Other variations may be designed where another rule or formula is used to reduce a plurality of locations in a group to a single representative location. Furthermore, although the points corresponding to a given base point are identified based on distance, in other variations, corresponding points may be identified based on other or additional or entirely different criteria.

In addition, although the above example focuses on multiplying location coordinates by coefficients in order to adjust locations found in trajectories based on secondary information, other examples are possible where the secondary information is used in other ways to alter the location values in trajectories that are processed or generated. Moreover, before a group of trajectories is combined one or more of them may be offset based on the location of vehicle. In addition, each of the trajectories that are behind the vehicle 210 (relative to its direction of travel) being discarded.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
receiving, by one or more processors, environmental information obtained using a sensor of an autonomous vehicle;
identifying a reference trajectory for the autonomous vehicle generated based on map information;
monitoring, using one or more processors, a first trajectory of a first road vehicle, wherein the first trajectory comprises a collection of locations traveled by the first road vehicle;
determining that the environmental information is inconsistent with the reference trajectory; and
when the reference trajectory is determined to be inconsistent with the environmental information, controlling, using the one or more processors, the autonomous vehicle to follow the first trajectory of the first road vehicle.

2. The method of claim 1, wherein identifying the reference trajectory is not based on a monitored trajectory of the first road vehicle or another vehicle.

3. The method of claim 1, wherein the environmental information indicates whether a road is blocked.

4. The method of claim 1, wherein the environmental information identifies an object, and wherein the reference trajectory is inconsistent when the object is in a path of the reference trajectory.

5. The method of claim 1, further comprising, monitoring, using one or more processors, a second trajectory of a second road vehicle, wherein the second trajectory comprises a collection of locations traveled by the second road vehicle, and wherein the controlling is further based on the second trajectory.

6. The method of claim 5, further comprising, using the first trajectory and the second trajectory to determine a representative trajectory, and wherein the controlling is further based on the representative trajectory.

7. The method of claim 1, further comprising, generating a representative trajectory using the first trajectory by shifting a location of the first trajectory in a first lane of the first trajectory to a location in a current lane of the autonomous vehicle, and wherein the controlling is further based on the representative trajectory.

8. A system comprising one or more processors configured to:
receive environmental information obtained using a sensor of an autonomous vehicle;
identify a reference trajectory;
monitor a first trajectory of a first road vehicle, wherein the first trajectory comprises a collection of locations traveled by the first road vehicle;
determine that the environmental information is inconsistent with the reference trajectory; and
when the reference trajectory is determined to be inconsistent with the environmental information, control the autonomous vehicle to follow the first trajectory of the first road vehicle.

9. The system of claim 8, wherein the one or more processors are further configured to identify the reference trajectory based on neither of a monitored trajectory of the first road vehicle or another vehicle.

10. The system of claim 8, wherein the environmental information indicates whether a road is blocked.

11. The system of claim 8, wherein the environmental information identifies an object, and wherein the reference trajectory is inconsistent when the object is in a path of the reference trajectory.

12. The system of claim 8, wherein the one or more processors are further configured to identify a second trajectory of a second road vehicle, wherein the second trajectory comprises a collection of locations traveled by the second road vehicle, and the one or more processors are further configured to control the autonomous vehicle further based on the second trajectory.

13. The system of claim 12, wherein the one or more processors are further configured to:
use the first trajectory and the second trajectory to determine a representative trajectory; and
control the autonomous vehicle further based on the representative trajectory.

14. The system of claim 8, wherein the one or more processors are further configured to generate a representative trajectory using the first trajectory by shifting a location of the first trajectory in a first lane of the first trajectory to a location in a current lane of the autonomous vehicle and to control the autonomous vehicle further based on the representative trajectory.

15. A non-transitory computer readable medium on which instructions are stored, the instructions, when executed by one or more processors, cause the one or more processors to perform a method, the method comprising:
receiving environmental information obtained using a sensor of an autonomous vehicle;
identifying a reference trajectory for the autonomous vehicle;
monitoring, using one or more processors, a first trajectory of a first road vehicle, wherein the first trajectory comprises a collection of locations traveled by the first road vehicle;
determining that the environmental information is inconsistent with the reference trajectory; and
when the reference trajectory is determined to be inconsistent with the environmental information, controlling the autonomous vehicle to follow the first trajectory of the first road vehicle.

16. The medium of claim 15, wherein identifying the reference trajectory is not based on a monitored trajectory of the first road vehicle or another vehicle.

17. The medium of claim 15, wherein the environmental information indicates whether a road is blocked.

18. The medium of claim 15, wherein the environmental information identifies an object, and wherein the reference trajectory is inconsistent when the object is in a path of the reference trajectory.

19. The medium of claim 15, wherein the method further comprises, monitoring, using one or more processors, a second trajectory of a second road vehicle, wherein the second trajectory comprises a collection of locations traveled by the second road vehicle, and wherein the controlling is further based on the second trajectory.

20. The medium of claim 19, wherein the method further comprises, using the first trajectory and the second trajectory to determine a representative trajectory, and wherein the controlling is further based on the representative trajectory.

* * * * *